United States Patent [19]

Cassidy

[11] 4,211,077
[45] Jul. 8, 1980

[54] HYBRID HYDROSTATIC-PNEUMATIC POWER GENERATION SYSTEM

[75] Inventor: Joseph C. Cassidy, Springfield, Oreg.

[73] Assignee: Energy Kinematics, Inc., Eugene, Oreg.

[21] Appl. No.: 968,034

[22] Filed: Dec. 11, 1978

Related U.S. Application Data

[63] Continuation-in-part of Ser. No. 920,456, Jun. 29, 1978, abandoned.

[51] Int. Cl.$^2$ .............................................. F15B 11/06
[52] U.S. Cl. ........................................ 60/398; 60/407; 290/52; 405/75; 405/78
[58] Field of Search ................. 60/327, 370, 371, 398, 60/407, 413, 416; 290/43, 52, 54; 405/52, 75, 78, 210; 417/334

[56] References Cited

U.S. PATENT DOCUMENTS

| | | | |
|---|---|---|---|
| 3,538,340 | 11/1970 | Lang | 290/54 X |
| 3,677,008 | 7/1972 | Koutz | 290/52 X |
| 3,996,741 | 12/1976 | Herberg | 60/413 X |

Primary Examiner—Edgar W. Geoghegan
Attorney, Agent, or Firm—Chernoff & Vilhauer

[57] ABSTRACT

The apparatus of the present invention is comprised of transfer tanks which are located below the hydraulic head of a dam. Connected to the transfer tanks are air inlets extending from the transfer tanks to the atmosphere, and having check valves located therein. A water inlet and valve, interconnect the transfer tanks with the fluid behind the dam, and a water outlet and valve empty the transfer tank downstream of the dam. A storage tank is interconnected to the transfer tank by transfer lines having check valves at their transfer tank ends, and a turbine outlet extends from the storage tank to an air driven turbine. In one embodiment of the invention two transfer tanks and one open-bottomed storage tank are located on the upstream side of the dam at its base. In this embodiment water outlets pass from the bottom of the transfer tanks through the face of the dam. In a second embodiment of the invention two transfer tanks, comprising elongate flow tubes, and several cylindrical storage tanks are located downstream of the dam at its base. The method which is employed with both embodiments of the invention comprises utilizing the hydraulic head of the dam to compress air in the transfer tank by admitting water through the water inlet means, and then storing the compressed air in the storage tank. The transfer tank is then emptied of water, and thus filled with air, and the cycle is repeated.

13 Claims, 4 Drawing Figures

HYBRID HYDROSTATIC-PNEUMATIC POWER GENERATION SYSTEM

CROSS REFERENCE TO RELATED APPLICATIONS

This application is a continuation-in-part of Application Ser. No. 920,456, filed June 29, 1978, now abandoned.

BACKGROUND OF THE INVENTION

This invention relates to using the kinetic energy of water impounded behind a dam to compress air, which is then stored for later generation of power.

Of the total number of dams in existence today only a small percentage have the capability to generate electric power, with the remainder being used primarily for flood control. In many of these dams the volume flow rate of the river they impound is not normally considered large enough to make continuous power generation economically practical even though over an entire day a large amount of energy passes over the spillway. However, since the stream flow downstream of these dams must remain constant, it is not possible to store the total kinetic energy capacity of each day's stream flow for use to produce a significant level of energy during the period of peak power demand.

A related problem arises on the larger dams from which hydroelectric power is already produced in the conventional manner. Again, since stream flow must be kept relatively constant, at times of reduced power demands excess water must be passed through the dam without the generation of power. Heretofore two solutions have been utilized to alleviate this problem. In the first all the water required to maintain stream flow is used to generate power at all times. The excess power generated during periods of low demand is then used to pump water from the reservoir behind the dam, thus temporarily lowering the reservoir, to a storage area which is separated from the dam. Then during periods of high power demand the stored water is allowed to flow back to the dam refilling the reservoir. While pump storage does permit maximum utilization of the flow generated by the impounded river, it is only possible with dams which are sited in an area where a large storage area can be obtained above the level of the dam. In addition, there are severe efficiency losses associated with the transfer of the water from the reservoir behind the dam to the storage area and then back to the reservoir.

A second method of utilizing the entire stream flow is to construct a secondary dam downstream of the hydroelectric dam. Then during peak power periods the normal stream flow can be exceeded to produce this power and the surplus water can be stored behind the secondary dam for release when power demand necessitates less than the normal amount of flow be used for power generation. However, the cost of constructing a secondary dam is considerable and it can be done only where the physical makeup of the river permits.

Accordingly, only in a few of the many hydroelectric dams presently in existence is it economically feasible to utilize the entire stream flow to generate power on a full-time basis. On all of the other dams, a portion of the stream flow must be bypassed around the dam with a resulting loss of power generation capacity.

Furthermore in all hydroelectric dams of the prior art, water is dropped through a penstock over a considerable portion of the head created by the dam in order to obtain the necessary velocity to drive the turbines which are used to generate power. Accordingly, the water becomes quite agitated and in the process absorbs nitrogen which is harmful to fish downstream of the dam. Also even though protective measures are taken, a large number of fish are drawn along with the flow of water through the turbines and are beat to death by the turbine blades. In addition, the very nature of water as a working fluid to drive turbines necessitates very low speed turbine operation which is inimical to high turbine efficiency.

In addition to the above problems, since the flow of a river behind a hydroelectric dam of the present type is in a high state of flux, there is a large amount of turbidity, whereby silt is build up behind the dam over a period of time. On the other hand, if normal stream flow could be allowed continuously to exist, even though electric power is not being generated, this phenomenon would not occur as the silt would continue to pass downstream with the river flow.

SUMMARY OF THE INVENTION

The apparatus of the present invention is comprised of transfer tanks which are located below at least a substantial portion of the hydraulic head created by the water impounded behind a dam. Air inlets, which pass from the transfer tanks to ambient air, have check valves which permit flow of air into the transfer tanks but not outwardly therefrom. Water inlets are arranged to permit fluid from upstream of the dam, which thus is under the influence of the hydraulic head, into the transfer tanks upon opening of inlet valves, and water outlets open from the transfer tanks to a point downstream of the dam so that the contents of the transfer tanks can be emptied upon the opening of outlet valves. Associated with the transfer tanks is a storage tank arranged for containing compressed air, and transfer lines interconnect the storage tank and the transfer tanks, with check valves located in the transfer lines being arranged to permit air to be passed from the transfer tanks to the storage tank but not in the reverse direction. A turbine outlet extends from the storage tank to a turbine for generating electric power from the air which is stored in the storage tank.

In one embodiment of the invention the apparatus is essentially located on the upstream side of the dam at the bottom of the reservoir which is impounded behind it. In this embodiment there are two or more transfer tanks which comprise enclosed transfer chambers, and a single storage tank which comprises an open-bottomed storage chamber having a greater volume than either of the transfer chambers. In addition, the bottom of the storage chamber is raised to a level slightly above the bottoms of the transfer chambers. In this embodiment the air inlets extend from the tops of the transfer chambers upwardly to the surface of the water impounded behind the dam. The water inlets are located at the bottoms of the transfer chambers where they will be acted upon by the full head of the dam, the water outlets pass through the face of the dam to its downstream side, and the transfer lines extend between the tops of the respective chambers. In operation the transfer tanks are filled and emptied cyclicly. Thus in one of the transfer tanks the water outlet valve is open and the water inlet valve is closed to empty the tank of water, thus filling the tank with air through the air inlet while in the other transfer tank the water inlet valve is open and the water outlet valve is closed thereby filling the tank with water under the influence of the head, so as to pressurize the air trapped in the transfer tank causing it to be passed through the transfer lines to the storage tank where it is maintained under pressure. Accordingly, one of the transfer tanks is being emptied at all times to maintain stream flow. However, since the tank is isolated from the hydraulic head while being emptied, the water is not greatly agitated during emptying and thus does not absorb nitrogen.

In a second embodiment of the invention, the apparatus is located on the downstream side of the dam at its base, either along side of or beneath the stream bed. The transfer tanks in this embodiment comprise two elongate hollow flow tubes which are interconnected to the reservoir behind the dam by a passageway which extends through the face of the dam. Valves located in the passageway allow selective control of which of the flow tubes is open for the admittance of water. Located adjacent to the flow tubes are a plurality of cylindrical containers which serve as the storage tanks, and a manifold, which interconnects the flow tubes and containers, acts both as the transfer lines and the turbine outlet. The air inlets are located at spaced intervals along the flow tubes, and rotary gate valves are located at the distal extremity of the flow tubes to serve as the water outlets therefrom. Check valves interface the ends of the flow tubes and the manifold, and a turbine control valve is located at the other end of the manifold upstream of the turbine.

In operation of this embodiment, water from the reservoir is passed to one of the flow tubes thereby compressing the air located in it and forcing the compressed air through the manifold to the storage tanks. Simultaneously the rotary gate valve in the other flow tube is open so that this flow tube is being drained of water and air is being drawn into it through the air inlets. The sequence is then reversed and the flow tube which was just filled with water is emptied and the one that was just emptied is filled to compress the air located in it. Therefore, as in the first embodiment, stream flow can be maintained relatively constant.

Accordingly, it is a principal object of the present invention to provide a power generation system wherein the kinetic energy of water impounded behind a dam is used to pressurize air which in turn is stored for later use in power generation.

It is a further object of the present invention to provide such a system wherein the apparatus is located upstream of the dam at its base.

It is a further object of the present invention to provide such a system where the apparatus is located below and downstream of the dam.

It is a further object of the present invention to provide such an apparatus which operates with a high efficiency.

It is a further object of the present invention to provide such a system wherein the amount of water which is released downstream of the dam is not necessarily dependent on the amount of power being generated.

It is a further object of the present invention to provide such a system which utilizes simplified apparatus for long lived, inexpensive, trouble free operation.

It is a further object of the present invention to provide such a system which causes no damage to fish.

It is a further object of the present invention to provide such a system which does not encourage the rapid buildup of silt behind the dam with which it is associated.

The foregoing objectives, features and advantages of the present invention will be more readily understood upon consideration of the following detailed description of the invention taken in conjunction with the accompanying drawings.

DETAILED DESCRIPTION OF A PREFERRED EMBODIMENT

Figure 1:
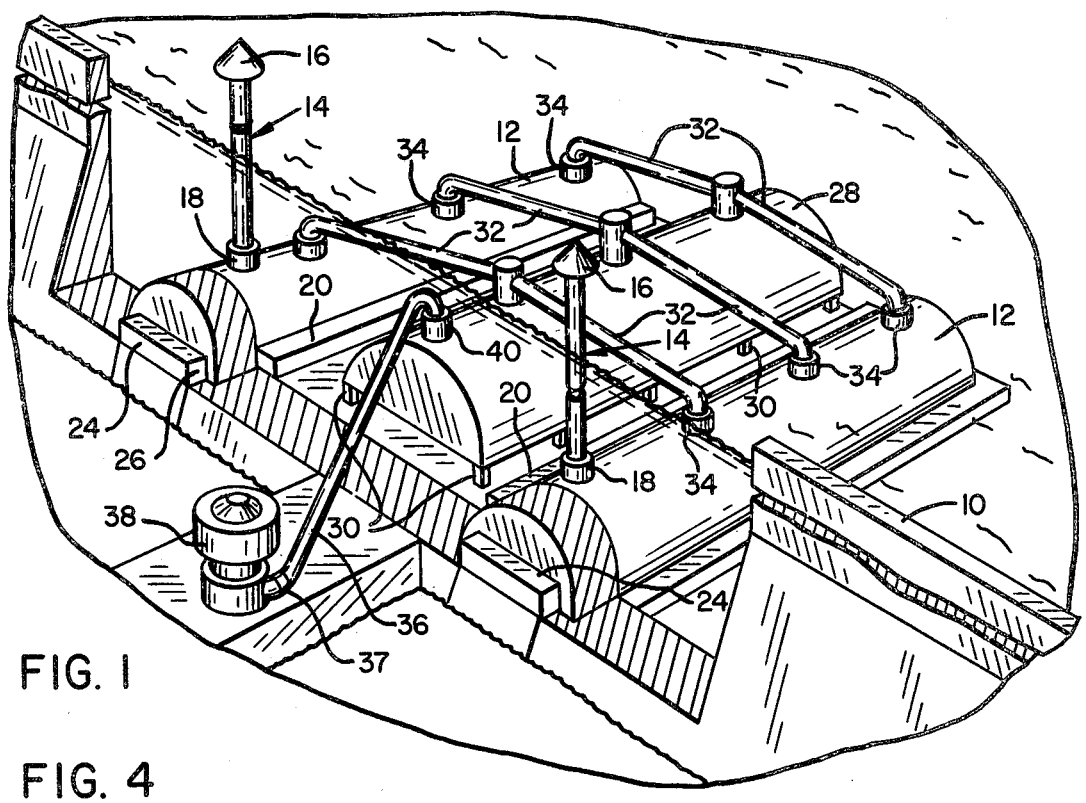
FIG. 1 is a semi-diagrammatic pictorial view, partially broken away, showing a preferred embodiment of an apparatus embodying the features of the present invention.
Figure 2:
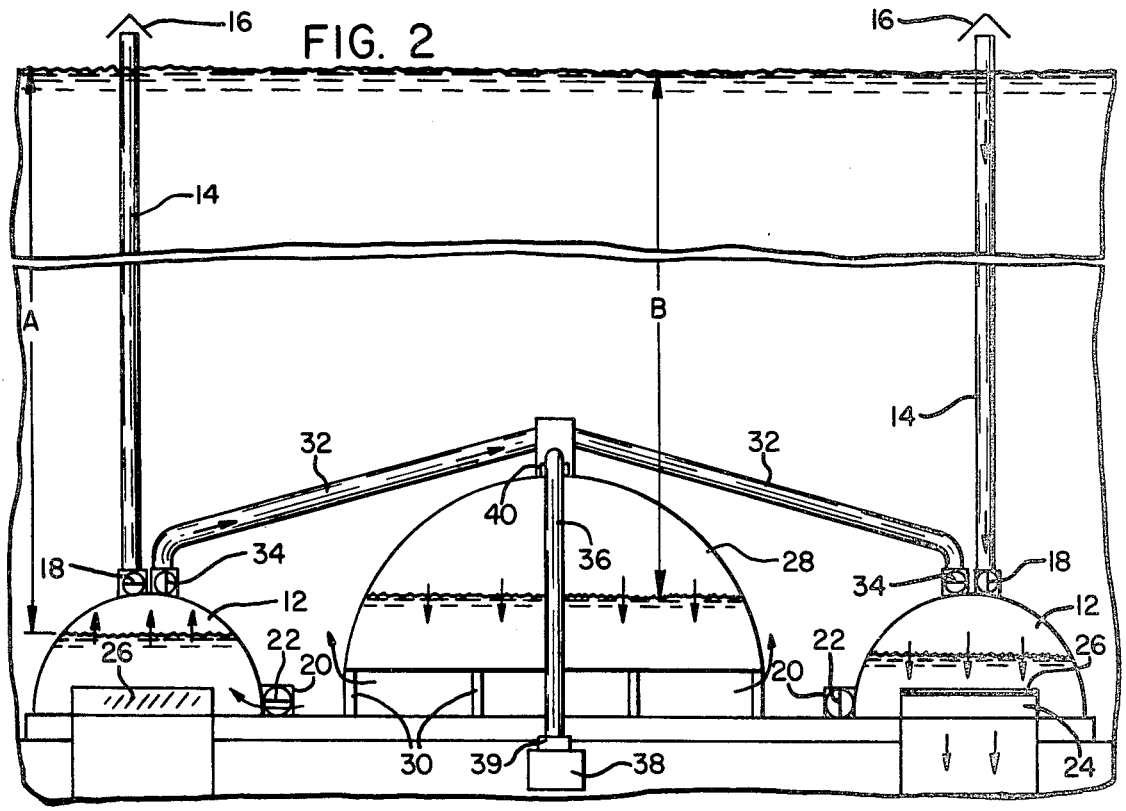
FIGS. 2 and 3 are semi-diagrammatic elevational views of the apparatus of FIG. 1, showing the sequence of its operation.
Figure 3:
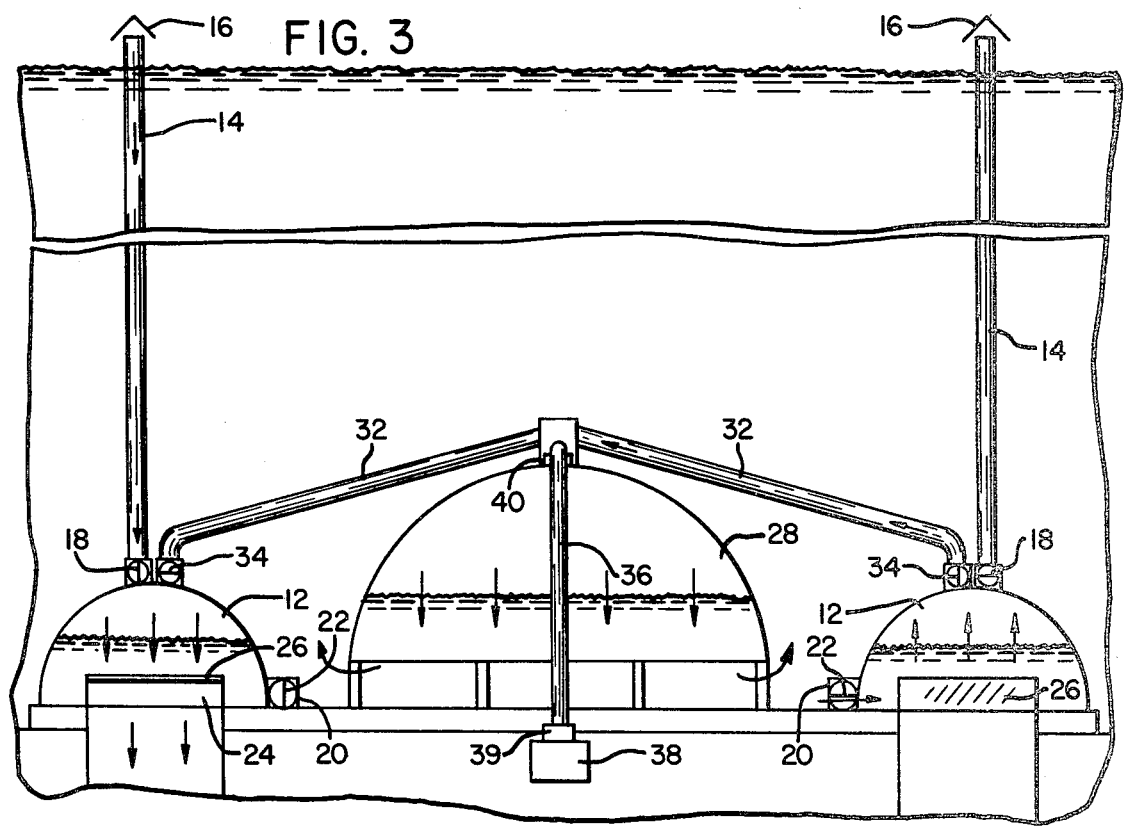

Referring to FIGS. 1 through 3 of the drawings, a preferred embodiment of the invention is shown as being located on the upstream side of a dam 10. Located at the bottom of the reservoir which is impounded behind the dam is transfer tank means which is illustrated as comprising two enclosed D-shaped transfer chambers 12. While the particular shape, size and number of the transfer chambers depends on the capacity and particular use of the dam, there should be at least two transfer chambers to obtain the optimum benefits of the invention, as will be more fully described later. In addition the material used to construct the transfer chambers is not limited except that it must provide sufficient strength, be impermeable to air and water, and be long-lasting when used in an underwater environment. Thus corrosion-resistant metal or sealed concrete will serve well for this purpose.

At the top of each transfer chamber is air inlet means 14 which interconnects the transfer chamber with the surface of the reservoir. A lid 16 located at the upper extremity of the air inlet means prevents water or other foreign material from entering the transfer chamber, and a check valve 18 permits flow of air downwardly into the transfer chamber but prevents flow of pressurized air from it. Extending along one of the lower edges of each transfer chamber is water inlet means 20 including an inlet valve 22 which is movable between an open position where water can flow into the transfer chamber, and a closed position where the transfer chamber is sealed. A motor (not shown), which preferably is pneumatically operated, is used to move the inlet valve between its open and closed positions. Located at the end of each transfer chamber which faces the dam is water outlet means 24 which extends from the bottom of the transfer chamber through the face of the dam to its downstream side. The water outlet means contains an outlet valve 26 which also is movable by means of motors (not shown) between an open position where water is allowed to empty from the associated transfer chamber and closed position where it is not.

Located between the two transfer chambers is storage tank means which, in the embodiment illustrated, comprises an opened bottomed D-shaped storage chamber 28. The storage chamber is fabricated in the same manner as the transfer chambers except that it is larger and is opened bottomed. The storage chamber is mounted on footings 30 so that its bottom is raised relative to the bottoms of the transfer chambers. Interconnecting the tops of the transfer chambers and the top of the storage chamber are a plurality of transfer lines 32. Transfer tank check valves 34, which are located in the transfer lines where they open into the transfer chambers, permit flow of air compressed from the transfer chambers to the storage chamber but not vice versa.

Turbine outlet means, such as pipe 36, extends from the top of the storage chamber to an air driven turbine 38, which is either placed outside of a solid wall dam of the type shown or, if desired, internally in a hollow dam. A control valve 39 located in the pipe 36 permits regulating of the flow of air to the turbine. Also a float valve 40 is located on top of the storage chamber to prevent water from entering pipe 36.

The method by which this embodiment of the invention is operated is best shown in FIGS. 2 and 3. Referring first to FIG. 2, the outlet valve 26 in the water outlet means 24 of the right hand transfer chamber is open and the inlet valve 22 in the water inlet means 20 of the right hand transfer chamber is closed so that the water located in the right hand transfer chamber is being released through the dam and thus is free to flow downstream. As the water is released, air is drawn into the tank 12 through the air inlet means and the transfer tank check valve 18, which is pulled open, to fill the void left by the evacuated water. During this portion of the cycle the transfer tank check valves 34 in the transfer lines 32 which interconnect the right hand transfer tank with the storage tank 28 are held closed due to the pressurized air contained in the storage tank 28.

On the other hand, in the left hand transfer tank the inlet valve 22 in the water inlet means 20 is open and the outlet valve 26 in the water outlet means 24 is closed so that it is being filled with water. Since the air which is in the tank has a pressure proportional to the amount of head "A", check valve 18 is closed and transfer tank check valve 34 is opened, and the air is forced into the storage chamber 28 displacing water from its bottom. Accordingly, the chamber is slowly being filled with air which is held at a pressure proportional to the amount of head "B". In addition, as more air is added, thereby displacing more water from the storage chamber 28, the water level in the storage chamber is lowered and thus the pressure in it is somewhat increased.

When the right hand transfer chamber 12 is completely emptied of water, and thus completely filled with air, its inlet valve 22 is opened and its outlet valve 26 is closed. Likewise, when the left hand transfer chamber is filled with water, and thus emptied of air, its inlet valve 22 is closed and its outlet 26 is opened. Accordingly the relative portion of the operational cycle which each transfer chamber is undergoing is reversed, as shown in FIG. 3. As a result the flow of pressurized air into the storage chamber 28 and the flow of water through the dam from the transfer chamber remains relatively constant. However, due to the difference in pressure, the transfer tanks are filled with water faster than they are emptied, therefore, the cycles are timed to overlap somewhat so that the stream flow downstream of the dam is maintained at a nearly constant rate.

As was noted above, the inlet and outlet valves can be operated by pneumatic motors which utilize the pressurized air generated by the apparatus. Due to the fact that neither of the valves has to open under appreciable pressure differential, little power is required for this purpose even though the area of the valves is quite large.

Also, while the check valves respond automatically to the varying pressure in the apparatus, the inlet and outlet valves must be externally controlled. For this purpose limit switches (not shown), which are sensitive to the water level in respective transfer chambers can be employed to automatically control the positions of the inlet and outlet valves.

When the storage chamber is sufficiently full, or as demand requires, air can be withdrawn from it through pipe 36, to drive turbine 38 and thus generate electricity by opening control valve 39. It will be noted that since the pressure of the air in the storage chamber is regulated by height "B" which remains relatively constant as the storage chamber is emptied, because the height of the storage chamber is small relative to its depth, the pressure of air supplied to the turbine also remains relatively constant. Also since the float valve closes when the storage chamber fills with water, no water can be accidentally passed to the turbine.

Figure 4:
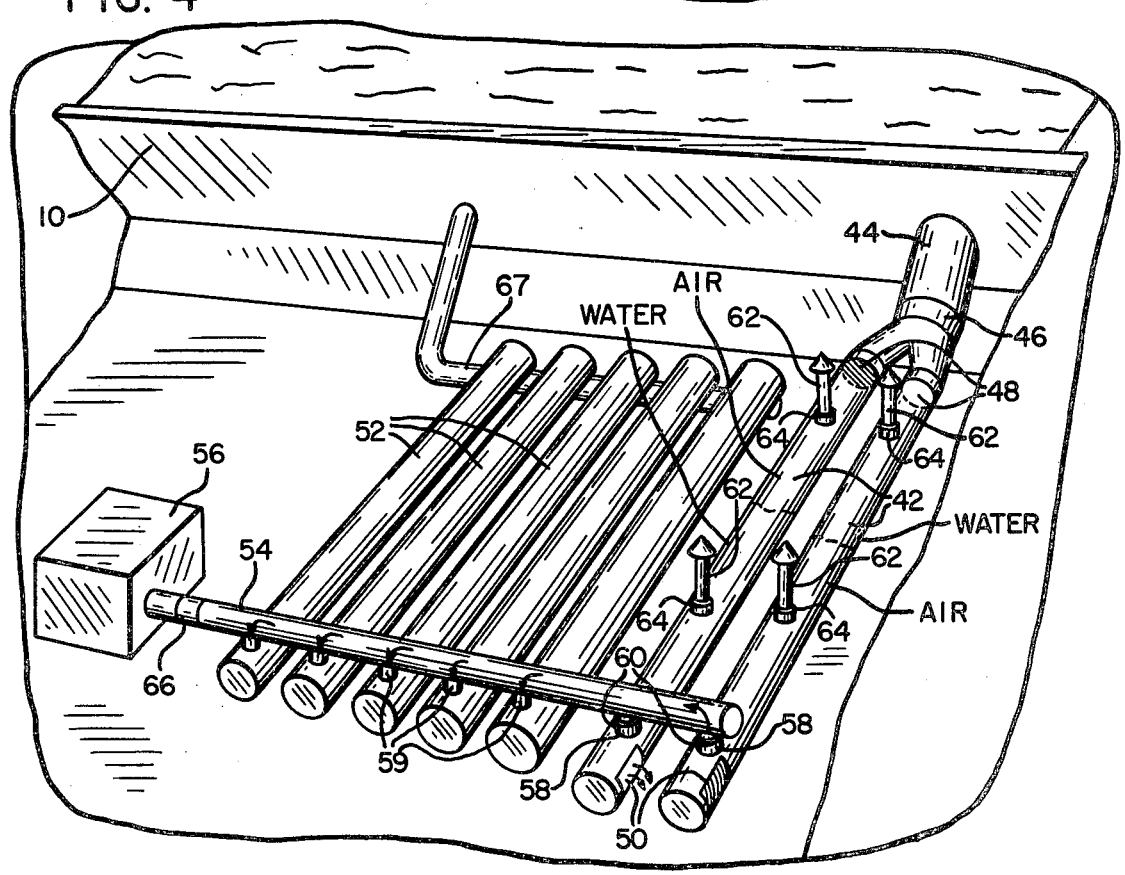
FIG. 4 is a semi-diagrammatic pictorial view showing another embodiment of the invention.

In a second embodiment of the invention, FIG. 4, the apparatus is located on the downstream side of the dam rather than its upstream side. This embodiment can be utilized with existing dams which can not as a practical matter be drained to accommodate the modifications necessitated by the prior embodiment. The transfer tank means in this embodiment comprises a plurality of elongate hollow flow tubes 42 which are located at or below the bottom of the head of water impounded behind the dam. While the drawings show the apparatus semi-diagrammatically, normally the stream bed (not shown) would be located directly below the dam and the apparatus would be located either below ground or to one side of the stream in a manner such that there would be as little environmental impact as possible.

The water inlet means includes a flow passageway 44 which passes through the face of the dam, and which then branches out to feed the flow tubes 42. An isolation valve 46 is located in the flow passageway upstream of where it branches, and water inlet means, such as gate valves 48, are located at the upstream end of each of the flow tubes. The gate valves are driven by pneumatic motors (not shown) in the same manner as the valves of the prior embodiment are. At the other ends of the flow tubes are the water outlet means which preferably comprise rotary gate valves 50 that open out of the sides of the flow tubes, and also are motor driven. The air inlet means in this embodiment comprises stand pipes 62, which are located at several positions along each flow tube, and check valves 64 which interconnect the stand pipes and the flow tubes.

Located adjacent to the flow tubes, the storage tank means comprises a plurality of cylindrical containers 52 and the transfer lines and turbine outlet means are integrated into a manifold 54 which passes from the tops of the flow tubes to the turbine 56 with stubs 59 interconnecting it to each of the containers 52. Float valves 58 are located between each of the flow tubes and the manifold, and a check valve 60 is located upwardly adjacent to each of the float valves. A motor operated turbine control valve 66 is located on the manifold where it interconnects with the turbine. While not essential, the storage tank pressure in this embodiment can also be made proportional to the amount of head from the storage tank to the top of the reservoir behind the dam by utilization of pressure equalization lines 67. Each equalization line is connected at one end to the bottom of its associated storage tank, and at its other end to the reservoir behind the dam. When the equalization lines are used, however, the bottom of the storage tanks 52 must be located slightly above the flow tubes 42.

The method by which this embodiment operates is basically the same as in the previous embodiment. In the portion of the cycle illustrated in FIG. 4, water is admitted through passageway 44 into the right hand flow tube 42 only, since the right hand gate valve 48 is open and the left hand gate valve 48 is closed. The rotary gate valve 50 in the right hand flow tube is closed so that the air in the right hand flow tube is compressed due to the hydraulic head of the water that is entering the flow tube. Thus check valves 64 in right hand stand pipe 62 are forced closed, and the pressurized air is passed into the manifold 54 past right hand check valve 60 into containers 52 through tubes 59. It will be noted that the check valve 60 in the left hand flow tube prevents the air from entering this flow tube.

Simultaneously, the left hand flow tube is being emptied of water into the river bed through its rotary gate valve 50 which is open. As the water is evacuated from the flow tube, the flow tube is filled with air through its associated stand pipe 62 and check valve 64.

The cycle is then reversed, as in the prior embodiment, with the air in the left hand flow tube 42 being compressed and the water being evacuated from the right hand flow tube. Thus stream flow remains constant in this embodiment also. As in the prior embodiment valve operation can be automated so that the apparatus becomes self controlling. The compressed air is withdrawn from the storage tanks 52 through the manifold 54 by opening turbine control valve 65, and like the first embodiment of the invention, when pressure equalization lines 67 are provided, the pressure of the air provided to the turbine remains essentially constant as the tanks are emptied.

In both of the embodiments, the normal dangers to fish associated with hydroelectric dams are not present. Firstly, since the water is not used to drive turbines directly, fish going down river are not physically injured by passing through the turbines. For much the same reason, the water does not absorb nitrogen, which normally kills a great deal of fish downstream of the dam. In either embodiment of the invention, the water is released relatively slowly from the transfer tank means and thus does not become stirred up.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. The method of utilizing the kinetic energy associated with the hydraulic head created by a dam having fluid stored behind its upstream side and open on its downstream side, comprising:
   (a) providing a transfer tank proximate the base of said dam, having air inlet means passing out of said fluid;
   (b) emptying the fluid from said transfer tank on the downstream side of said dam while simultaneously filling said transfer tank with air through said air inlet means;
   (c) refilling said transfer tank with fluid from the upstream side of the dam, through a water inlet in said transfer tank while isolating said air inlet means, thereby pressurizing the air located in said transfer tank;
   (d) storing said pressurized air in a storage tank which is interconnected to said transfer tank; and
   (e) withdrawing said pressurized air from said storage tank to perform work.

2. The method of claim 1 wherein there are at least two transfer tanks which empty and fill cyclicly in a manner such that the out flow of fluid from the transfer tanks remains relatively constant.

3. Apparatus for utilizing the kinetic energy associated with the hydraulic head created by a dam having fluid stored behind its upstream side and open on its downstream side, comprising:
   (a) transfer tank means located such that it is below at least a substantial portion of said hydraulic head;
   (b) air inlet means passing from said transfer tank means to outside of said fluid;
   (c) water inlet means interconnecting said transfer tank means with said fluid upstream of said dam;
   (d) water outlet means extending from said transfer tank means to a point on the downstream side of said dam and proximate the bottom of said hydraulic head;
   (e) storage tank means for containing compressed air;
   (f) transfer lines interconnecting said storage tank means and said transfer tank means; and
   (g) turbine outlet means extending from said storage tank.

4. The apparatus of claim 3 including power generation means operably interconnected to said turbine outlet means.

5. The apparatus of claim 3 including:
   (a) check valves, located in said air inlet means to prevent flow of pressurized air from said transfer tanks therethrough;
   (b) transfer tank check valves located in said transfer lines to prevent flow of pressurized air from said storage tank therethrough; and
   (c) float valve means located in said turbine outlet means to prevent water from passing from said storage tank therethrough.

6. The apparatus of claim 3 wherein said storage tank means has a bottom surface which is located above said water inlet means and said storage tank means comprises inlet means in said bottom surface which interconnects said storage tank means with the fluid stored behind the upstream side of the dam.

7. The apparatus of claim 6 wherein said transfer tank means comprises a plurality of elongated transfer chambers which are located on the upstream side of said dam at the base thereof, and said storage tank means comprises an open bottomed storage chamber with its bottom lying on a plane which medially intersects said transfer tank means.

8. The apparatus of claim 7 wherein said water inlet means comprises an inlet valve which is integral with the transfer tank means proximate the bottom most point thereof.

9. The apparatus of claim 7 wherein said water outlet means comprises an outlet valve and a passageway which extends through said dam.

10. The apparatus of claim 6 wherein said transfer tank means comprises a plurality of elongate hollow flow tubes which are located on the downstream side of said dam at the base thereof, and said storage tank means comprises a plurality of cylindrical containers which are located adjacent to said flow tubes.

11. The apparatus of claim 10 wherein said cylindrical containers are located above said flow tubes, including pressure equalization lines which interconnect said storage tank means at the bottom surface thereof, and the fluid stored behind the upstream side of the dam.

12. The apparatus of claim 10 wherein said water inlet means comprises a flow passageway which passes through said dam and gate valve located in said inlet means.

13. The apparatus of claim 10 wherein said water outlet means comprises a rotary gate valve located in the side wall of said flow tube.

* * * * *

UNITED STATES PATENT AND TRADEMARK OFFICE
CERTIFICATE OF CORRECTION

PATENT NO. : 4,211,077
DATED : July 8, 1980
INVENTOR(S) : Joseph C. Cassidy

It is certified that error appears in the above-identified patent and that said Letters Patent are hereby corrected as shown below:

| | |
|---|---|
| Col. 7, Line 32 | Change "65" to --66--. |
| Claim 7, Line 6 | "lying on" should read --being oriented to form--; |
| Line 6 | Delete "medially"; |
| Line 7 | Add --intermediate its vertical extent-- after the word "means". |

Signed and Sealed this

Third Day of February 1981

[SEAL]

Attest:

RENE D. TEGTMEYER

Attesting Officer     Acting Commissioner of Patents and Trademarks